(12) United States Patent
Hassani et al.

(10) Patent No.: US 11,932,198 B2
(45) Date of Patent: Mar. 19, 2024

(54) VEHICLE TRANSFER KEY MANAGEMENT SYSTEM

(71) Applicant: Ford Global Technologies, LLC, Dearborn, MI (US)

(72) Inventors: Ali Hassani, Ann Arbor, MI (US); John Robert Van Wiemeersch, Novi, MI (US); Ryan Edwin Hanson, Livonia, MI (US); Aaron Matthew Delong, Toledo, OH (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 402 days.

(21) Appl. No.: 17/080,052

(22) Filed: Oct. 26, 2020

(65) Prior Publication Data

US 2022/0126786 A1  Apr. 28, 2022

(51) Int. Cl.
| | |
|---|---|
| *B60R 25/24* | (2013.01) |
| *B60R 25/102* | (2013.01) |
| *G07C 9/00* | (2020.01) |
| *H04L 9/40* | (2022.01) |
| *H04L 29/06* | (2006.01) |

(52) U.S. Cl.
CPC ............ *B60R 25/24* (2013.01); *B60R 25/102* (2013.01); *G07C 9/00857* (2013.01); *H04L 63/068* (2013.01); *B60R 2325/205* (2013.01); *G07C 2009/00888* (2013.01)

(58) Field of Classification Search
CPC ...... H04W 4/40; H04L 63/068; H04L 63/062; G07C 9/00857; G07C 2009/00888; G07C 2209/04; B60R 25/102; B60R 25/24; B60R 2325/205
See application file for complete search history.

(56) References Cited

U.S. PATENT DOCUMENTS

| | | | |
|---|---|---|---|
| 6,028,537 A * | 2/2000 | Suman | B60K 35/00 340/988 |
| 8,890,654 B2 | 11/2014 | Van Wiemeersch | |
| 9,933,763 B1 * | 4/2018 | Menkveld | E05F 15/668 |
| 10,202,100 B1 | 2/2019 | Tucker et al. | |
| 2004/0242198 A1 * | 12/2004 | Oyagi | H04L 63/0853 455/411 |
| 2007/0270114 A1 * | 11/2007 | Kesler | H02H 3/006 455/187.1 |
| 2009/0309696 A1 * | 12/2009 | Tsuruta | B60R 25/04 340/5.22 |
| 2013/0259232 A1 | 10/2013 | Petel | |

(Continued)

OTHER PUBLICATIONS

Zhou Wei et al., "HIBS-KSharing: Hierarchical Identity-Based Signature Key Sharing for Automotive," IEEE Access, vol. 5, 2017, pp. 16314-16323, Doi: 10.1109/ACCESS.2017.2737957.

*Primary Examiner* — Yong Hang Jiang
(74) *Attorney, Agent, or Firm* — Frank Lollo; Brooks Kushman, P.C.

(57) ABSTRACT

A transfer key system for a vehicle may include a key receptacle configured to detect the presence of a transfer key, and a controller configured to receive key status signals from the key receptacle, and activate the transfer key as an active transfer key in response to the status signal indicating a removal of the transfer key from the key receptacle and receiving an authentication signal from a user.

15 Claims, 5 Drawing Sheets

(56) References Cited

U.S. PATENT DOCUMENTS

| | | | |
|---|---|---|---|
| 2013/0278411 A1* | 10/2013 | DiBella | G10G 7/00 |
| | | | 70/14 |
| 2014/0240086 A1* | 8/2014 | Van Wiemeersch | B60R 25/25 |
| | | | 340/5.51 |
| 2016/0055699 A1* | 2/2016 | Vincenti | H04W 12/04 |
| | | | 340/5.61 |
| 2018/0326947 A1 | 11/2018 | Oesterling et al. | |
| 2019/0057558 A1* | 2/2019 | Gupta | B60W 40/08 |
| 2019/0268169 A1 | 8/2019 | Castillo | |
| 2019/0359173 A1 | 11/2019 | Pudar et al. | |
| 2021/0291786 A1* | 9/2021 | Cisneros | B60R 25/01 |

* cited by examiner

VEHICLE TRANSFER KEY MANAGEMENT SYSTEM

TECHNICAL FIELD

This disclosure generally relates to transfer key management systems.

BACKGROUND

Automotive vehicles may have various authentication systems to enable drivers to access and start their vehicles. These authentication systems include deviceless solutions (i.e., codes or biometrics). Other device-driven solutions may use keys, key fobs, or phones as devices for authentication. However, existing systems may necessitate that a driver physically hand his or her device or give his or her credentials to another person in order for that person to operate the vehicle. This may especially be the case in valet situations, maintenance situations, etc.

SUMMARY

A transfer key system for a vehicle may include a key receptacle configured to detect the presence of a transfer key, and a controller configured to receive key status signals from the key receptacle, and activate the transfer key as an active transfer key in response to the status signal indicating a removal of the transfer key from the key receptacle and receiving an authentication signal from a user.

A transfer key system for a vehicle for presenting alerts to a user of the vehicle, may include a temperature sensor configured to detect temperature inside a vehicle cabin, and a controller configured to detect a presence of a transfer key within a vehicle cabin, determine whether the transfer key has been activated, and receive a cabin temperature from the temperature sensor, and transmit a temperature notification in response to the temperature falling outside of a predefined threshold.

A method for a transfer key system for a vehicle may include receiving key status signals from a key receptacle within a vehicle, activating a transfer key as an active transfer key in response to the status signal indicating a removal of the transfer key from the key receptacle, and transmitting a notification to a mobile device associated with a vehicle owner of the activation of the transfer key.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In certain situations, a driver of a vehicle may wish to transfer a key to another driver for gaining access and drive privileges to the vehicle (e.g., valet drivers, dealer service personnel, friends and family, etc.). Some of these situations may include emergency situations such as allowing police access to move the vehicle after an accident, transferring the key in the event of a medical emergency, as well as transferring the key under duress such as a carjacking or robbery. Thus, programming a back-up or transfer key may allow a driver, under prescribed conditions, to easily transfer a key to allow vehicle access and drive privileges to another person. Under the right circumstances, e.g., appropriate authentication, the transfer key may be handed to another driver within a few seconds. A transfer key system of a vehicle may include a key receptacle and an authentication method. The authentication method could include a device configured to authenticate a user such as a key fob or phone configured to grant access to the receptacle. The key may be activated after removal from the receptacle.

The receptacle may be configured to house a key, which could take the form of a smart key fob, an NFC/RFID key card, or a brought-in consumer device such as a smartphone or any portable device able to run apps and communicate with the vehicle over RF protocols supported by the vehicle. The key may be removed from the receptacle and transferred to a second user. Thus, although a second user may not be a registered user, the second user may use the vehicle in ordinary course.

Described herein is a solution to enable and manage transfer keys. Transfer keys and non-transfer keys are discerned by one or both of their physical appearance and a unique key index associated with the body control module (BCM). The keys may be enrolled into the BCM at production in an inactive state. The keys may remain inactive until activation is authorized by the user. Various processes for activating and deactivating may be realized.

Figure 1:
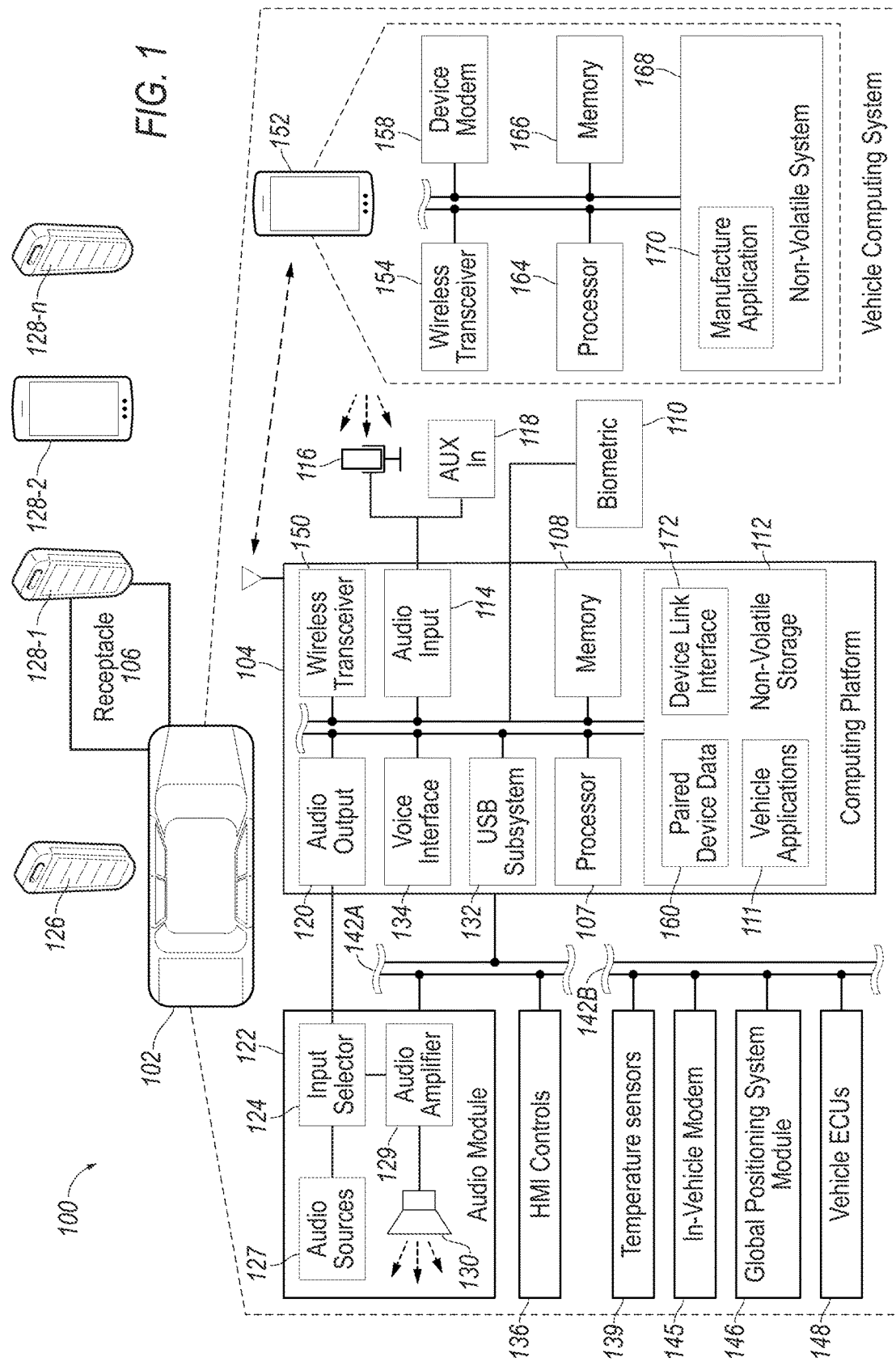
FIG. 1 illustrates an example vehicle system of the key transfer system.

FIG. 1 illustrates an example system 100 including a vehicle 102 configured to access telematics servers and a mobile device 152 having a manufacturer application 170. The vehicle 102 may include various types of passenger vehicles, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the vehicle 102 may include the SYNC system manufactured by The Ford Motor Company of Dearborn, MI It should be noted that the illustrated system 100 is merely an example, and more, fewer, and/or differently located elements may be used.

The computing platform 104 (also referred to herein as a controller 104) may include one or more processors 107 configured to perform instructions, commands and other routines in support of the processes described herein. For instance, the computing platform 104 may be configured to execute instructions of vehicle applications 111 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 107 of the computing platform 104. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 107.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 127 to an audio amplifier 129 for playback through vehicle speakers 130 or headphones (not illustrated). The audio sources 127 may include, as some examples, decoded amplitude modulated (AM), frequency modulated (FM) or satellite digital audio radio service (SDARS) signals, and audio signals from compact disc (CD) or digital versatile disk (DVD) audio playback. The audio sources 127 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118. The computing platform 104 may utilize a voice interface 134 to provide a hands-free interface to the computing platform 104.

The computing platform 104 may also receive input from human-machine interface (HMI) controls 136, also referred to herein as a vehicle display 136, configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). In some cases, the display 136 may be a touch screen further configured to receive user touch input via the video controller, while in other cases the display 136 may be a display only, without touch input capabilities. The display 136 may present warnings, information, control options, and the like to the user. In one example, the vehicle display 136 may be used to facilitate adding authorized user fingerprints and/or programming of key fobs, including daily use keys and transfer keys 128.

The vehicle 102 may include various temperature sensors 139 configured to detect the temperature both within the cabin and outside of the vehicle cabin. The temperature sensors 139 may be part of a climate control system configured to control cabin temperature, or the temperature sensors 139 may be stand-alone sensors configured to send cabin temperature specifically for the transfer key system 100. The temperature sensors 139 may transmit sensed temperature to the computing platform 104 in order for the computing platform to detect situation where the transfer key 128 may not operate due to high temperatures. This is described in more detail below with respect to FIG. 6.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 145 (which may not be present in some configurations), a global positioning system (GPS) module 146 configured to provide current vehicle location and heading information, and various vehicle ECUs 148 configured to incorporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, passive entry, passive start, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122, HMI controls 136, and temperature sensors 139 may communicate with the computing platform 104 over a first in-vehicle network 142-A, and the vehicle modem 145, GPS module 146, and vehicle ECUs 148 may communicate with the computing platform 104 over a second in-vehicle network 142-B. In other examples, the computing platform 104 may be connected to more or fewer in-vehicle networks 142. Additionally, or alternately, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, wearable devices, E-textiles or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally, or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, such that the computing platform 104 may automatically reconnected to the mobile devices 152 referenced in the paired device data 160 without user intervention. In some vehicles 102, the computing platform 104 wireless transceiver 154 may be configured to provide hotspot functionality to user's mobile devices 152.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally, or alternately, the computing platform 104 may utilize the vehicle modem 145 to communicate information between the computing platform 104 and the communications network 156, without use of the communications facilities of the mobile device 152.

Similar to the computing platform 104, the mobile device 152 may include one or more processors 164 configured to execute instructions of mobile applications loaded to a memory 166 of the mobile device 152 from storage medium 168 of the mobile device 152. In some examples, the mobile applications may be configured to communicate with the computing platform 104 via the wireless transceiver 154 and with the remote telematics server or shuttle server 162 or other network services via the device modem 158. The computing platform 104 may also include a device link interface 172 to facilitate the integration of functionality of the mobile applications into the grammar of commands available via the voice interface 134. The device link interface 172 may also provide the mobile applications with access to vehicle information available to the computing platform 104 via the in-vehicle networks 142. An example of a device link interface 172 may be the SYNC APPLINK component of the SYNC system provided by The Ford Motor Company of Dearborn, MI.

A manufacturer application 170 may be an example of an application installed to the mobile device 152 and configured to utilize the device link interface 172 to interact with the computing platform 104. The manufacturer application 170 may be configured to operate when untethered from the vehicle 102, such as when remote from the vehicle. The manufacturer application 170 may be further configured to communicate with servers (e.g., server 162) via the communications network 156, as discussed in detail below. The user may interact with the manufacturer 170 through the HMI of the mobile device 152, via a web interface, or via the HMI of the vehicle 102, to avoid distraction while driving. Typically, the mobile device 152 may belong to the owner or operator of the vehicle. The manufacture application 170 may allow the user to perform, modify, certain vehicle functions from the mobile device 152. The manufacture application may allow the user to permit access to ancillary keys, or devices such that those devices may gain access to and operate the vehicle. In some examples, the manufacturer application 170 may be an application specific to the transfer of keys, but may also be integrated into another application, such as FORDPASS.

A biometric sensor 110 may be configured to collect biometric inputs from a user. In one example, the sensor 110 may be a fingerprint scanner configured to read at least one fingerprint or thumbprint of the user (hereafter referred to as fingerprint). In another example, the sensor 110 may be a voice recorder (e.g., microphone 116), retina scanner, or vehicle camera. In the examples of the vehicle camera, the biometric sensor 110 may be configured to recognize a user's face, gait, etc., from outside of the vehicle. The biometric sensor 110 may also be included within the vehicle. In one example, the biometric sensor 110 may be integrated with a push-button starter. In another example the biometric sensor 110 may be integrated within the top of a gear stick of the vehicle, or within the dashboard. In yet another configuration, the biometric sensor 110 may be located in close proximity or within the receptacle 106. The biometric sensor 110 may communicate with the controller 104. The biometric sensor 110 may be internal or external to the vehicle.

The controller 104 may include the processor 107 configured to facilitate the processes as described herein. The processor 107 may facilitate receiving biometric data at the controller 104. It may convert or translate the biometric data into a usable biometric template. These templates may be used to authenticate a user based on the received biometric data. In the example of the biometric data being a fingerprint, the data may need to be converted to a readable format, such as a template, before the authentication process may be performed. For example, each fingerprint includes unique data points, e.g., an arch in the center, a double loop, etc. These minutiae may be translated into a numeric pattern, e.g., a vector, which makes up the biometric template. Because the biometric template is a numerical representation of the fingerprint data, an image of the fingerprint itself is never stored within the controller 104. This template may be represented and transmitted in a standard format such as Biometric Interworking Protocol (BIP). A Biometric Identification Record (BIR) may include a header, biometric data and a signature, which may be recognized by the controller 104.

Biometric data may be received at the controller 104 in several situations. Initially, data may be received for enrollment purposes. A user may enroll his or her biometric data (e.g., fingerprint/face) during an enrollment mode. Additionally, or alternatively a personal identification number (PIN) may be entered via a separate interface and analyzed by the controller 104 to further authenticate the user prior to biometric enrollment. Upon authenticating the user, the received biometric data may be converted to a biometric template, as described above. The enrolled biometric template is then saved in the memory in a template database. The enrolled template may be saved in the database and used at a later time to authenticate the user.

As mentioned, biometric data may also be received to authenticate the user. The biometric data may be received in an effort to gain access to the vehicle. When biometric data is received for authentication purposes, the data may be converted to a received biometric template at the controller 104. A comparator within the controller 104 may then compare the received template with the enrolled templates within the template database. Upon locating a match of the received template with at least one of the enrolled templates, the comparator may communicate a 'pass' indicator to the controller. If a match is not returned, a 'fail' indicator may be returned. Upon receiving a positive match indication from the comparator, access and drive rights to the vehicle may be granted. Such access may include unlocking the door or doors to a vehicle in order to allow the user to enter the vehicle. Access may also include other functionality such as regular operation of the vehicle (e.g., starting the vehicle, driving, operating the radio, lights, etc.). As described in more detail below, upon certain authentication, a transfer key fob 128 may also be activated.

The key fobs 126, 128, also referred to as keys 126, 128 and key devices 126, 128, described herein, may have passive entry/passive start (PEPS) capabilities. The primary key 126 may typically be held and maintained by the vehicle owner or administrator. The transfer keys 128-1. 128-2, 128-n may be secondary keys typically used to grant temporary or limited access to the vehicle and its features.

The key fobs, as well as other devices herein, may also be part of systems known as Passive/Keyless Access System, Advance Key, Comfort Access, Enter-N-Go™, Intelligent Access, Smart Entry, SmartKeys, Intelligent Key®, Smart-Pass, Kessy, to name a few. Key fobs may communicate with the vehicle via LF and/or UHF frequency communication protocols, including challenges and responses, between the fobs and the vehicle. The keys 126, 128 may be an NFC device enrolled into the BCM. A PEPS database may include a listing of the registered fobs and a status associated therewith. For example, the database may maintain that keys 126 may be a primary key, while 128-1 may be a secondary key. These associated status indicators may relate to certain vehicle settings associated with the normal user of that transfer key 128, such as seat position, temperature control, etc.

The PEPS capabilities may provide several keyless functions to a user including passive entry, passive engine start, engine shut off, passive lock, etc. In one example, a key 126 may be associated with a user (e.g., in the user's pocket or purse). A user may touch or toggle a handle of a door of the vehicle or push the start button which is recognized by controller 104.

Notably, PEPS features are not limited to use cases involving a key fob. Such features may be available with other devices and authentication mechanisms. In one example the device may be a phone or other user mobile device. Biometric inputs may also enable PEPS features such as facial recognition (as the user approaches the vehicle). Thus, PEPS authentication may be made with a physical device, as well as through use of biometric attributes of the user. Physical devices such as key fobs, phones, cards, may be stowable within the receptacle.

In addition to a manufacturer specific key, other devices, such as NFC cards and devices, as well as mobile devices, include phones, key fobs, etc., may be used as vehicle "keys." That is, instead of having a key specific for a vehicle access, a user's mobile device may also be used to grant access to the vehicle. Additionally, or alternative, the reference to "keys" may also include authentication via biometric attributes such as facial recognition, etc. Though "keys" are referred to herein, the term may generally include all device capable of granting access to the vehicle 102. In the example in FIG. 1, the transfer keys 128 may include a transfer device 128-2. This transfer key 128-2 may be the secondary mobile device of the owner of the vehicle 102. The owner may wish to transfer the key to a valet, a car mechanic, or other person that may require temporary access to the vehicle. Although not shown, this transfer key 128-2 may also include the manufacture application 170, though not necessarily required.

In some examples, an "emergency" transfer key 128 may be stored within a vehicle receptacle 106. This is discussed in more detail with respect to FIG. 2.

By activating the transfer key 128 stored within the receptacle 106 as an active key, the key 128 may be transferred to any other user and that user may have full access and drive rights to the vehicle.

Thus, in certain emergency situations, the transfer key 128 may be transferred to another user. For example, in a situation in which the driver of a vehicle has suffered from a health crisis while driving, such as a heart attack, stroke, etc., and emergency personal has removed the person from the vicinity of the vehicle, the transfer key 128 within the receptacle 106 may be removed and used by a second user such as the passenger or another driver. The second user may then operate the vehicle and drive the initial driver to the hospital, follow the ambulance, move the vehicle to a safer location, etc. In another example, a driver may wish to valet their vehicle without giving the valet personnel their key fob. Upon arriving at the valet location, the driver may put their car in park and extract the transfer key fob 128 from the receptacle 106. Upon returning a transfer key 128 back to the receptacle 106 after use, the key 128 may then be disabled.

Figure 2:
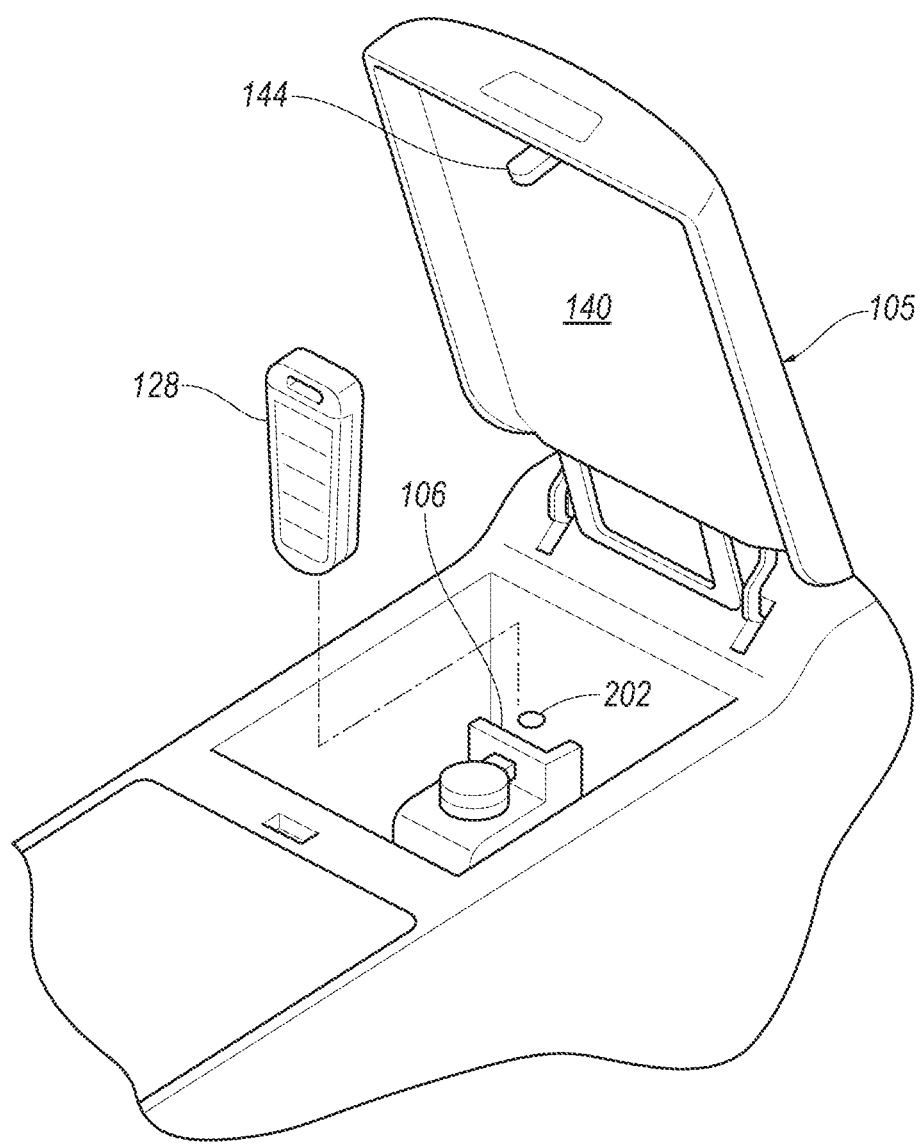
FIG. 2 illustrates an example receptacle and transfer key.

FIG. 2 shows an exemplary receptacle 106 having a receptacle lid 140 and within a vehicle. The receptacle 106 may be configured to receive and hold the transfer key 128. The lid 140 may include a latch 144. The latch 144 may be configured to maintain the lid 140 in a closed position. Additionally, the latch 144 may be in communication with the biometric sensor 110, or another biometric sensor 110 configured to read biometric inputs and may be locked until authenticated a biometric input is received. The latch may also be unlocked leaving the key accessible but inactive (e.g., not authenticated).

A key detector 202 may be arranged within the receptacle 106 to detect the removal or replacement of the key 128. This detector 202 may be a spring-loaded actuator having a wire to transmit key status signals indicating actuation thereat. In another example, the detector 202 may be a contactless reader in communication with the transfer key via, for example, using LF or NFC/RFID communication.

The detector 202 may indicate to the controller 104 that a key is present within the receptacle. Additionally, an indicator LED may be present within the receptacle. The indicator may indicate to a user the status of the transfer key 128. For example, the indicator may be green when the transfer key 128 is active and red when inactive. The HMI may also indicate various statuses of the key to the user, including providing an alert upon the change of status such as when the key is removed. For example, the HMI may inform the user that the key has been removed but that it is inactive. The HMI may provide for a predetermined time from removal for which the key must be activated. This time-window may also be presented to the user. As explained above, the key may be activated via authentication by sensing of a biometric attribute, starting key technology such as passive key via fob or phone, coded ignition, etc.

The transfer key 128 may be automatically deactivated upon return to the receptacle 106. If the transfer key 128 was in valet mode, then the user may be prompted to select if the vehicle is to exit valet mode. This is described with respect to FIGS. 3 and 5 herein. Further, to prevent accidental stranding of the second user, the second user may be prompted that the transfer key 128 will be deactivated within a given time window (i.e., 10 seconds) if the key 128 is not removed from the receptacle.

In the event that the phone as key may be used as the transfer key 128, this option may only be available if other devices such as a PEPS fob, NFC card, etc., are not. Further, in situations where the user is not biometrically programmed to the vehicle, the user may still take advantage of the system by having a transfer key available, so they do not have to give the second user their phone.

In certain situation, the transfer key 128 may be limited in its capabilities. Certain autonomous features may be limited, as well as other vehicle system such as the use of data, tethering to the vehicle via SYNC, etc. A Remote Park Assist (RePA) and other remote control features may also not be enabled. While the transfer key 128 may respond to commands from these systems, these systems may ignore commands from the transfer key 128. That is, the controller 104 may ignore some forms of communication and commands from a device (either key fob, NFC device, phone) that has been labeled and tagged as a transfer key 128. Other limits imposed on vehicle features may include a speed limiter, audio limiter, restricting hands-free calling, restricting remote control features (e.g. parking, trailering), placing geo-fence on functionality, activation timer, etc.

Figure 3:
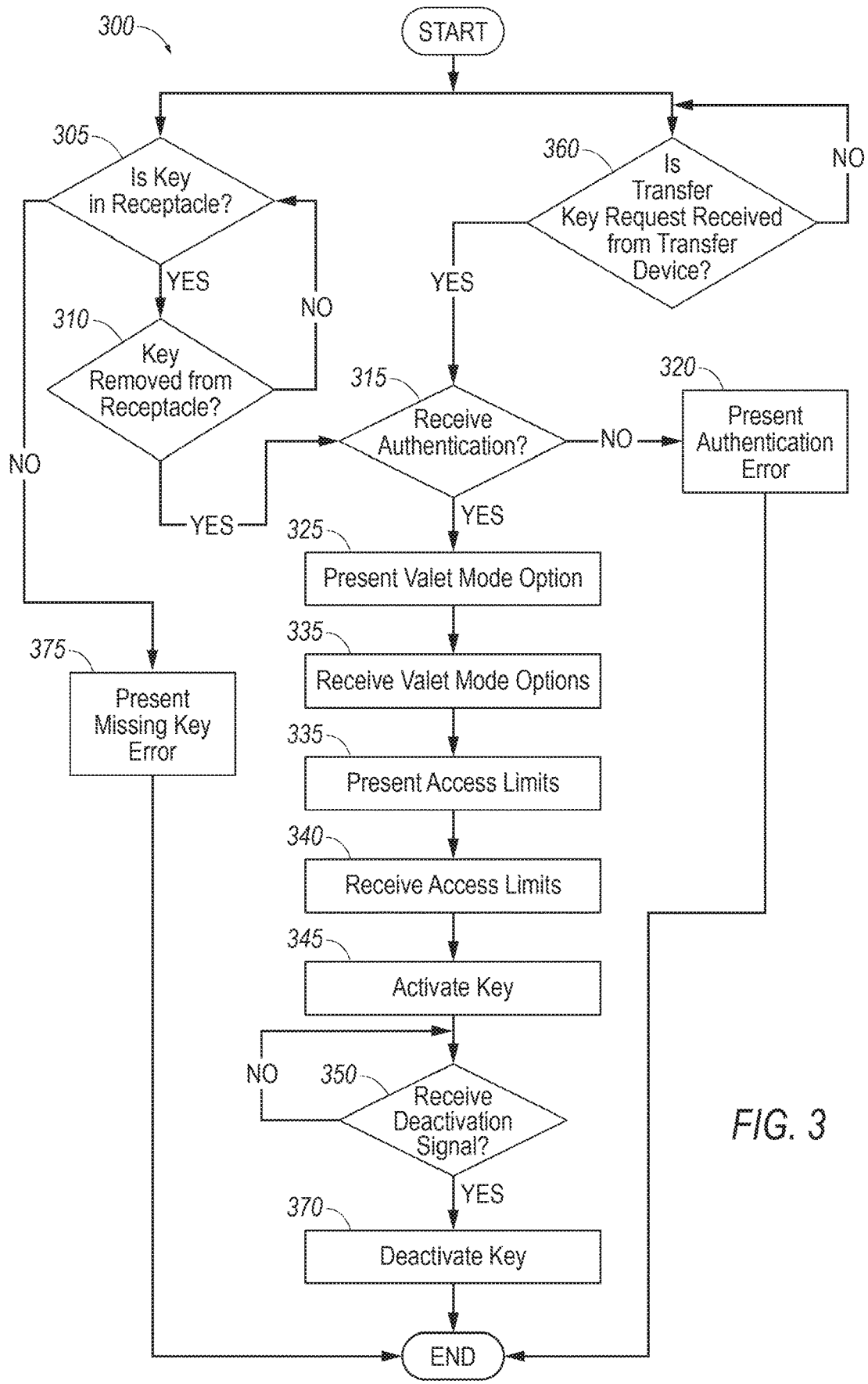
FIG. 3 illustrates an example process for the key transfer system.

FIG. 3 illustrates an example process 300 for the key transfer system 100. As explained above, transfer keys 128 may include both a physical PEPS type key, as well as a device, or phone, as a key. Additionally, or alternatively, the device may be a card, such as an NFC/RFID card. At block 305, the controller 104 may determine whether a transfer key 128 is located within the receptacle 106. As explained above, the key detector 202 may detect the removal or replacement of the transfer key 128. The detector 202 may indicate to the controller 104 that a key is present within the receptacle 106 where the detector 202 is in a state of depression while the transfer key 128 is within the receptacle. The controller 104 may also determine whether a physical key is located within the receptacle 106 by sending a low frequency signal or NFC/RFID signal from the controller 104. If a physical key is located within the receptacle 106, the key may respond to the low frequency or NFC/RFID signal by transmitting a response signal at a similarly low frequency.

Due to the location of the receptacle with respect to the controller 104, the transfer key 128 may only need to transmit signals at low frequencies, as opposed to higher frequencies when attempting to gain access to the vehicle or start the engine. Additional information may be transmitted to the controller 104 during this response. For example, the ID of the key fob may be transferred. Other relevant information such as a vehicle identification number associated with the key fob, time stamp, etc., may also be transmitted. If the controller 104 receives a response from a key fob or the key fob detector 202 indicating that the key fob is located within the receptacle 106 (e.g. a low frequency response) the process proceeds to block 310. If not, the process proceeds to block 375.

In block 310, the controller 104 may determine whether the transfer key 128 has been removed from the receptacle 106. This may be determined by a lack of depression at the detector 202. The controller 104 may also determine that the transfer key 128 has been removed from receptacle 106 by a lack of a low frequency or NFC/RFID response from a key fob in response to a low frequency or NFC/RFID challenge. Further, the controller 104 may issue a high power low frequency challenge in search of a previously programmed transfer key 128. If no high frequency response is heard from the transfer key 128, the vehicle may warn the user that the transfer key 128 is not in the receptacle 106 or the vehicle vicinity. The controller 104 may then instruct the vehicle display 136 to indicate that no transfer key 128 is located within the receptacle 106. For example, the display 136 may show a message reading "No Transfer Key Detected." This message may be displayed for a predefined number of cycles before it is suspended. For example, the message may be displayed five consecutive times. If the controller 104 determines that the key 128 has been removed, the process 300 may proceed to block 315.

Notably, the controller 104 may issue a message that the transfer key is not found regardless of whether the system is active or inactive. This may alert the user to the fact that a transfer key has either been removed and not replaced, or that a device has not been activated/located.

In reference to block 360, a physical key may not be necessary and a phone as a key may function as the transfer key. As explained above, this may be in response to the primary user losing key 128, as well as simply a general preference of one of the first or second user to use the transfer device 128-2 as a transfer key.

The second user may request that the first user remotely activate the transfer key via the manufacturer application 170 (i.e., FORDPASS). This may be especially helpful in a situation where the second user may have accidently stranded themselves. For example, the second user may have lost or deactivated the transfer key without a backup way of accessing and operating the vehicle 102. For added security, this process may be limited to only a certain time window after deactivation, as well as geo-fencing, etc. The vehicle administrator may remotely activate or inactive the key at any time.

In block 315, the controller 104 may determine whether the user is authenticated. The user authentication may come in one of many forms and may be similar to authorization for a vehicle motive start. In one example, the user may be authenticated via presence of a known key device, such as a smart key fob or phone-as-a-key. The phone may communicate via wireless RF (e.g. BLE, Wi-Fi, UWB) or via NFC. In another example, the user may be authenticated via biometric identification of the driver at the driver's seat. These examples are described in detail herein. In another example, the user may be authenticated via the entering of a password into the in-vehicle HMI. In another example, the fact that the vehicle is in an active running mode (e.g., motive, accessory, or delayed accessory mode) and not in a secure idle mode. Notably, the user may be authenticated prior to being within the vehicle and prior to the vehicle start if a clear intent to access the vehicle is recognized and the user is authenticated. The user may also be authenticated via the mobile device 152 using the application and phone as key features.

If the user is authenticated, the process 300 may proceed to block 325. If not, the process 300 proceeds to block 320.

Figure 4:
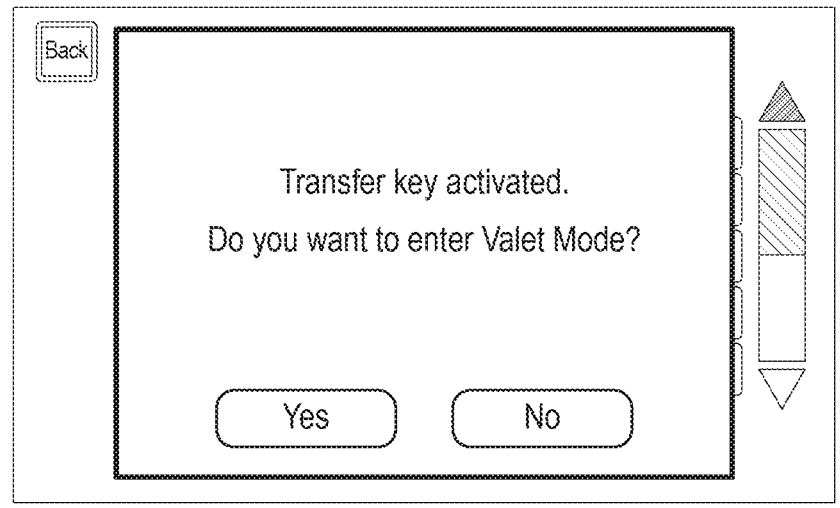
FIG. 4 illustrates an example human machine interface for the key transfer system.

At block 325, the controller 104 may present a valet mode option. This option may be presented via the vehicle display 136. The display 136 may present a screen requesting feedback from the user. An example screen is illustrated in FIG. 4. The user interface 400 may indicate to the user that the transfer key has been activated. That is, the transfer key may now be handed to someone and used to gain access to the vehicle 102. The screen 500 may also ask the user whether the transfer key 128 should be activated in the valet mode. That is, "do you want to enter valet mode." The user may indicate his or her answer by touching one of the buttons presented via the user interface 400. As explained, valet mode may allow the person in possession of the transfer key to operate the vehicle. However, certain features may be disabled, as well as certain data being inaccessible to the person with the transfer key, such as the vehicle's previous routs, saved home addresses, etc.

While an HMI screen is illustrated and some form of touch feedback is requested of the user at the user interface 400, other forms of requests and feedback may be presented. For example, an audible message may be played via the vehicle speakers, such as "Do you wish for this key to be activated in valet mode." The user may respond with an audible response, picked up by the vehicle speakers. Gestures may also be used to provide a response. As explained above, the HMI screen may also indicate the location of the key as well as the status (e.g., active or inactive), among other information relating to the key status and activation.

At block 330, the controller 104 may receive the user selected to enter valet mode.

At block 335, the controller 104 may present additional access limit options to the user. These access limit options may be limits on vehicle options and features not otherwise limited by the valet mode settings. For example, the mileage, duration, or length of time may be limited. The user may select to have the transfer key expire after a certain predefined metric such as a maximum number of miles, drive time, or set time window. If a relative asks to borrow the vehicle, the duration may be limited to the days that the relative wishes to borrow the car. In another example, the mileage for a teenage driver may be limited. Further, to account for scenarios where users may desire the key to be active until they have clearly left the vicinity of the vehicle, the user may have the option to use a simple time-out after the door is locked metric, or perform walk away detection. That is, the key may move to inactive status once the user has left the vehicle. The walk away detection may be detected the external cameras or the departure of the mobile device or key fob associate with the user. These options and metrics may be presented to the user via the HMI either on the vehicle via the display 136 or via the mobile device 152.

At block 340, the controller 104 may receive the user selected access limits.

At block 345, the controller 104 may activate the transfer key 128. This may be in response to the user being authenticated. The various modes and options selected at blocks 330 and 335 may be applied to the transfer key 128. Upon activation, notification may be provided to one or both of the first and second users. The notification may be made via the manufacturer application 170 should status alerts be configured in the application. Other forms of alerts may come via prompts on the vehicle display 136, as well as text messages to the mobile devices. The notifications may include location and time stamp information.

At block 350, the controller 104 may determine whether a deactivation signal has been received. Depending on whether the transfer key 128 is a physical device maintained within the receptacle 106, or whether the transfer key is another user mobile device, the deactivation signal may be received in various forms. In the event of a physical transfer key 128 maintained in the receptacle, the deactivation signal may be a signal received from the key detector 202 that the key has been returned to the receptacle. In the phone as a key example, the transfer key 128-2 may send the deactivation signal. This deactivation signal may be automatic due to an expiration or initiated by the second user via the manufacturer application 170. Furthermore, the deactivation signal may be sent only after the user deliberately chooses to deactivate the device and this user is authenticated via the same methods described above for activation of the transfer key.

Regardless of whether the transfer key is a physical key or phone as a key, the controller 104 may automatically receive the deactivation signal in the event that that the predefined metric set forth at block 335 is met. For example, if the length of time set for the transfer key 128 has lapsed, the access given to the transfer key, regardless of whether it is a physical key or mobile device, may indicate the deactivation signal. In another example, the deactivation signal may be transmitted from the user mobile device 152 via the application to cease access for the authorized transfer key. That is, the user may turn off the transfer key from a remote location. This may be beneficial if the user detect abuse of the transfer key privileges or that the transfer key 128 cannot be found within the cabin.

If the controller 104 receives a deactivation signal, the process 300 proceeds to block 370. If not, the process 300 returns to block 345.

At block 370, the controller 104 may instruct the transfer key 128 to deactivate. That is, the transfer key 128 may no longer gain access to or operate the vehicle. In some situation, especially the one where a key fob 128 is deactivated upon return to the receptacle 106, the controller 104 may prompt the user for the option to remove the vehicle from valet mode. An example HMI is illustrated and described in FIG. 5. The process 300 may then end.

At block 375, the controller 104 may instruct the vehicle display 136 to display a missing key error to indicate that a key is missing from the receptacle 106 to the user. The controller 104 may, in addition or in the alternative, present the error message via the display on the mobile device 152, audible indicate the error, etc.

At block 320, the controller 104 may similarly instruct the vehicle display 136 to display an authentication error to indicate that the user has not been authenticated. The controller 104 may, in addition or in the alternative, present the error message via the display on the mobile device 152, audible indicate the error, etc.

FIG. 4 illustrates an example user interface 400 for presenting the user with the option to program a key 128 for a valet mode. The user interface 400 may be presented via either the vehicle display 136 or the mobile device 152. Via user input, the controller 104 may receive user input indicating whether valet mode should be entered.

Figure 5:
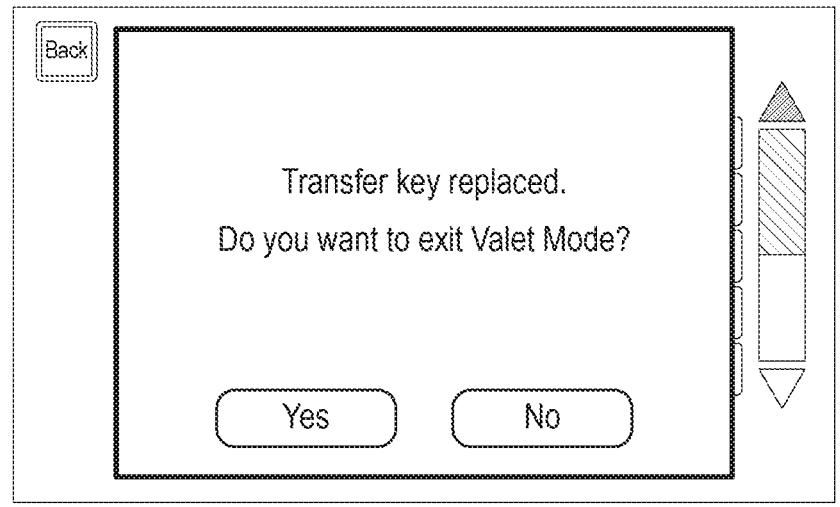
FIG. 5 illustrates another example human machine interface for the key transfer system.

FIG. 5 illustrates an example user interface 500 for presenting the user with the option to exit valet mode. As explained above, this prompt may be presented in response to the transfer key 128 being returned to the receptacle 106.

Figure 6:
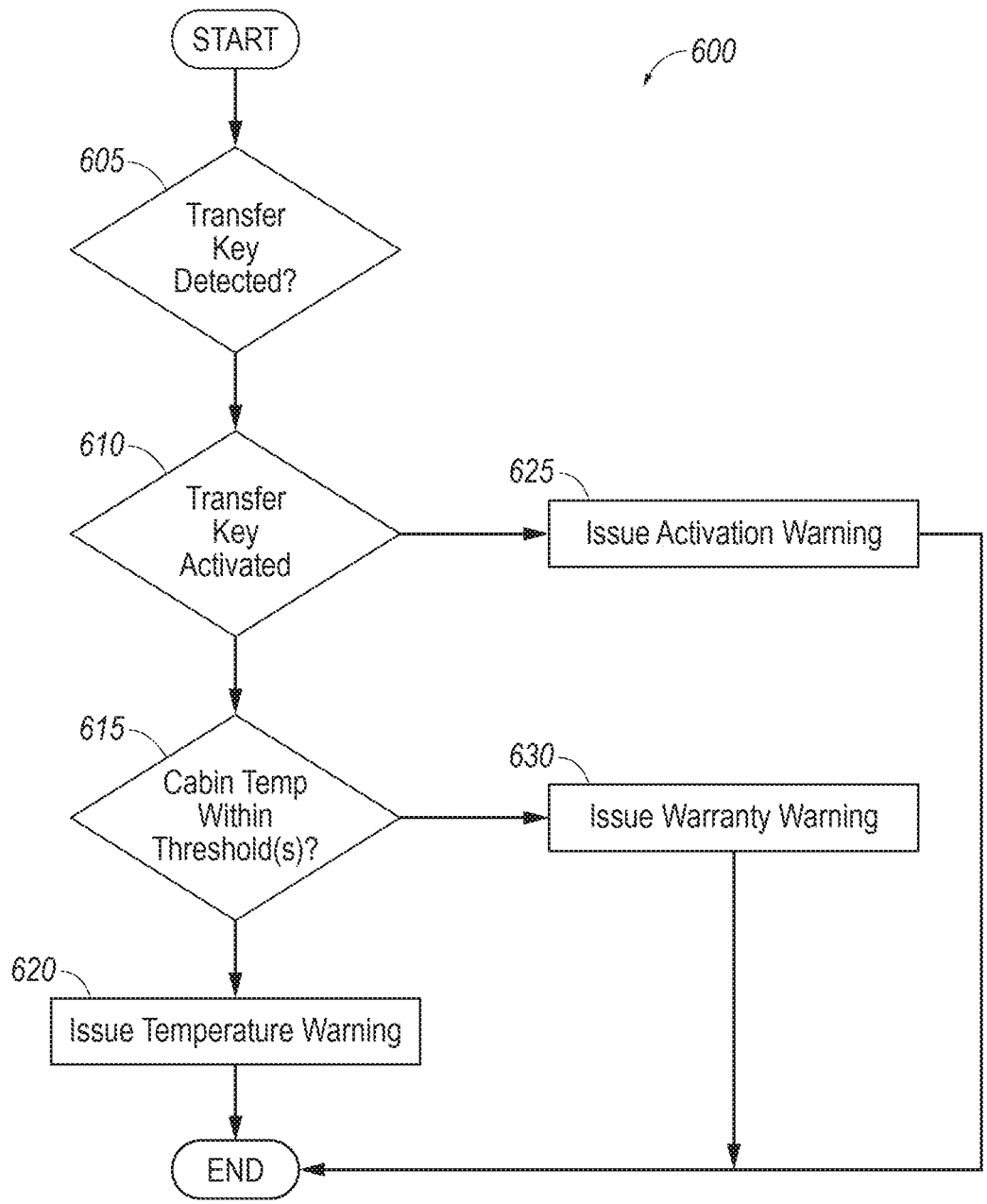
FIG. 6 illustrates an example warranty process for the key transfer system.

FIG. 6 illustrates an example process 600 for a warranty system of the transfer key system 100. In some examples, if a driver or other passengers do not recognize a device that has been designated as a transfer key (i.e., NFC card, PEPs fob, or other smart device), the user may assume that the transfer key or vehicle is malfunctioning. In order to negate this and put the user at ease, certain messages and information may be presented to the user.

At block 605, the controller 104 may determine whether a transfer key is detected. This may be achieved similar to block 305 in FIG. 3. If a transfer key is detected, the process 600 proceeds to block 610. If not, the process 600 ends.

At block 610, the controller 104 may determine whether the transfer key is activated. This may be achieved at block 345 in FIG. 3. If the transfer key 128 is not activated, the process proceeds to block 625. If the transfer key 128 is activated, the process 600 proceeds to block 615.

At block 615, the controller 104 may determine whether the cabin temperature exceeds is within a predefined threshold. The threshold may be set at a point where the transfer key 128 may cease to function appropriately due to the temperature. That is, if the temperature of the battery exceeds a certain threshold, the battery may cease to provide the necessary power to the key 128. The temperature may be acquired from the temperature sensors 139. The threshold may depend on the type of transfer key 128. In the example where the transfer key 128 is a mobile device or smart device, the threshold may be approximately 35 degrees Celsius. In the example where the transfer key 128 is a PEPS fob, the temperature threshold may be approximately 60 degrees Celsius. Minimal temperature thresholds may also be considered, such as below freezing for smart devices.

If the cabin temperature falls outside of a predefined threshold, the process 600 proceeds to block 620. If not, the process 600 proceeds to block 630.

At block 620, the controller 104 may issue a warning that the key 128 may not be functioning properly due to the high temperatures. At block 625, the controller 104 may issue a warning that the key 128 is not functioning properly because the transfer key is not activated. In some instances, the key 128 may be a physical key fob or NFC card. These physical keys may have a similar appearance to other devices held by the driver, the driver's partner, etc. In this case, whenever someone tries to use a key, such as the stored key that looks similar to fully functioning keys, the user may be unaware that the stored key is the backup or emergency transfer key. This may occur when the driver leaves with an authorized key (either physical, biometric, phone, etc), and the person left in the vehicle has no valid key. The person may attempt to use the stored key to move the vehicle while the driver is gone. However, if the stored key is not activated, the vehicle will not respond. In the event of an NFC card, the NFC reader will not recognize the NFC card either. Thus, whenever a person attempts to use the stored key passively with no valid key in the vehicle cabin, the controller 104 may issue a prompt that the feature is not available. For example, the alert may be "vehicle start unavailable, FOB designed as ETK, ETK is not active." The prompt may be pushed to the vehicle display, mobile device, etc. The prompt may include other features that are attempted by the user with the inactive key such as unlock, lock, panic, trunk, power sliding door, etc. The prompt that use the term ETK or spell it out as Emergency Transfer Key.

In the example of an NFC card as the key 128, when tapped on the NFC reader within the vehicle, the controller 04 may instruct for a prompt such as "this NFC card is designated as an ETK, ETK is not active." Thus, a better user experience may be appreciated with prompts and communication between the vehicle and the users.

At block 630, the controller 104 may issue a warranty warning that the key 128 is not functioning properly and may need to be replaced. These warnings, similar to other messages discussed herein, may be presented via the vehicle display 136, via mobile devices 152, 128-2. The warnings may also be transmitted via the vehicle speakers, etc.

Accordingly, a system described herein provides a simplified solution for programming back-up keys and an authentication system configured to ensure security of the vehicle is maintained.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

In general, computing systems and/or devices such as such as the controllers, biometric sensing devices, displays telematics functions, etc., may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices, such as the controllers, biometric sensing devices, displays telematics functions, etc., may generally include computer-executable instructions that may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory or a computer-readable medium, etc., and executes these instructions, thereby performing one or more processes, including one or more of the processes described herein.

Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions on one or more computing devices, stored on computer readable media associated therewith. A computer program product may comprise such instructions stored on computer readable media for carrying out the functions described herein. In some examples, the application software products may be provided as software that when executed by processors of the devices and servers provides the operations described herein. Alternatively, the application software product may be provided as hardware or firmware, or combinations of software, hardware and/or firmware.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transfer key system for a vehicle, comprising:
   a key receptacle configured to detect the presence of a transfer key;
   a temperature sensor configured to detect temperature inside a vehicle cabin; and
   a controller configured to
      receive key status signals from the key receptacle;
      activate the transfer key as an active transfer key in response to the status signal indicating a removal of the transfer key from the key receptacle and receiving an authentication signal from a mobile device associated with a vehicle owner, the mobile device being separate and distinct from the transfer key;
      receive a cabin temperature from the temperature sensor;
      transmit a temperature notification to the mobile device in response to the temperature falling outside of a predefined threshold and the activation of the transfer key; and
      transmit a warranty warning indicating a possible transfer key failure in response to the transfer key being activated and the temperature being within a predefined threshold.

2. The system of claim 1, wherein the controller is further configured to apply a valet mode to the activated transfer key limiting vehicle features when the vehicle is accessed using the transfer key.

3. The system of claim 1, wherein the controller is further configured to apply user defined access limits to the activated transfer key limiting vehicle features when the vehicle is accessed using the transfer key.

4. The system of claim 1, wherein the controller is further configured to deactivate the transfer key in response to receiving a subsequent key status signal indicating replacement of the transfer key into the key receptacle and a user authentication signal.

5. The system of claim 1, wherein the controller is further configured to deactivate the transfer key in response to a deactivation signal being received from the mobile device, wherein the mobile device is remote from the vehicle.

6. A transfer key system for a vehicle for presenting alerts to a user of the vehicle, comprising:
   a temperature sensor configured to detect temperature inside a vehicle cabin; and
   a controller configured to
      detect a presence of a transfer key within a vehicle cabin;
      determine whether the transfer key has been activated;
      receive a cabin temperature from the temperature sensor; and
      transmit a temperature notification in response to the temperature falling outside of a predefined threshold and the transfer key being activated; and
      transmit a warranty warning indicating a possible transfer key failure in response to the transfer key being activated and the temperature being within a predefined threshold.

7. The system of claim 6, wherein the controller is further configured to transmit an activation notification in response to the transfer key not being activated.

8. A method for a transfer key system for a vehicle, comprising:
   receiving key status signals from a key receptacle within a vehicle;
   activating a transfer key as an active transfer key in response to the status signal indicating a removal of the transfer key from the key receptacle;
   transmitting a notification to a mobile device associated with a vehicle owner of the activation of the transfer key;
   receiving a cabin temperature from a temperature sensor; and transmitting a temperature notification in response to the temperature falling outside of a predefined threshold and the transfer key being activated; and transmitting a warranty warning indicating a possible transfer key failure in response to the transfer key being activated and the temperature being within a predefined threshold.

9. The method of claim 8, further comprising activating the transfer key as active in response to receiving an authentication signal from the mobile device associated with the vehicle owner, the mobile device being separate and distinct from the transfer key.

10. The method of claim 8, further comprising applying a valet mode to the activated transfer key limiting vehicle features when the vehicle is accessed using the transfer key.

11. The method of claim 8, further comprising applying a user defined access limits to the activated transfer key limiting vehicle features when the vehicle is accessed using the transfer key.

12. The method of claim 8, further comprising deactivating the transfer key in response to receiving a subsequent key status signal indicating replacement of the transfer key into the key receptacle.

13. The method of claim 8, further comprising deactivating the transfer key in response to a predefined duration lapsing.

14. The method of claim 8, further comprising deactivating the transfer key in response to a deactivation signal being received from the mobile device, wherein the mobile device is remote from the vehicle.

15. The method of claim 8, wherein the notification is in response to the transfer key being activated.

\* \* \* \* \*